United States Patent [19]
Fujioka et al.

[11] Patent Number: 6,127,503
[45] Date of Patent: Oct. 3, 2000

[54] ADHESIVE SILICONE COMPOSITIONS

[75] Inventors: Kazutoshi Fujioka; Hironao Fujiki, both of Usui-gun, Japan

[73] Assignee: Shin-Etsu Chemical Co., Ltd., Tokyo, Japan

[21] Appl. No.: 09/185,509

[22] Filed: Nov. 4, 1998

[30] Foreign Application Priority Data

Nov. 5, 1997 [JP] Japan ..................... 9-319037

[51] Int. Cl.$^7$ .................................... C08G 77/08
[52] U.S. Cl. ..................... 528/15; 524/730; 524/731; 524/538; 524/780; 524/783; 524/785; 524/788; 524/789
[58] Field of Search ............... 528/15; 524/730, 524/731, 780, 783, 785, 788, 789, 538

[56] References Cited

U.S. PATENT DOCUMENTS

| | | |
|---|---|---|
| 3,527,842 | 9/1970 | Clark ........................ 260/825 |
| 5,366,805 | 11/1994 | Fujiki et al. . |
| 5,366,806 | 11/1994 | Fujiki et al. . |
| 5,405,896 | 4/1995 | Fujiki et al. . |
| 5,418,065 | 5/1995 | Fujiki et al. . |
| 5,536,803 | 7/1996 | Fujiki et al. .............. 528/15 |
| 5,792,812 | 8/1998 | Fujiki et al. ............. 525/105 |

FOREIGN PATENT DOCUMENTS

| | | |
|---|---|---|
| 0 601 883 | 6/1994 | European Pat. Off. ........ C08L 83/07 |
| 2 017 826 | 4/1970 | Germany . |
| 5-111981 | 5/1993 | Japan . |
| 6-171021 | 6/1994 | Japan . |
| 6-171022 | 6/1994 | Japan . |
| 6-171023 | 6/1994 | Japan . |
| 6-172738 | 6/1994 | Japan . |
| 6-271684 | 6/1994 | Japan . |
| 8-174604 | 7/1996 | Japan . |
| 8-245890 | 9/1996 | Japan . |
| 9-165516 | 6/1997 | Japan . |
| 9-165517 | 6/1997 | Japan . |
| 2137644 | 10/1984 | United Kingdom . |

*Primary Examiner*—Robert Dawson
*Assistant Examiner*—Jeffrey B. Robertson
*Attorney, Agent, or Firm*—Millen, White, Zelano & Branigan P.C.

[57] ABSTRACT

An organic silicon compound having at least one phenyl skeleton, at least one nitrogen atom, and at least one SiH radical is added to an adhesive silicone composition comprising a diorganopolysiloxane containing at least two alkenyl radicals, an organohydrogenpolysiloxane containing at least two SiH radicals, and a platinum catalyst. The composition firmly adheres to organic resins, especially polyamide and polyimide resins, but not to metals.

19 Claims, 1 Drawing Sheet

ADHESIVE SILICONE COMPOSITIONS

BACKGROUND OF THE INVENTION

1. Field of the Invention

This invention relates to an adhesive silicone composition of the addition curing type, and more particularly to an adhesive silicone composition which can firmly bond with organic resins, especially polyamide resins, but is not adhesive to metals so that molded parts are improved in mold release.

2. Prior Art

Several methods are known for bonding addition curing type silicone elastomers to thermoplastic resins. One known method involves applying a primer to a surface of thermoplastic resin, applying and curing an uncured silicone elastomer composition thereto. In another method, a self-tack silicone elastomer composition is directly applied and cured to a thermoplastic resin. Since the former method, however, requires the step of applying the primer to a molded part of thermoplastic resin, it is time consuming and complicated in equipment and process. The latter method suffers from the drawback that the self-tack silicone elastomer composition itself sticks to a metal mold.

Under the circumstances, we proposed in JP-A 172738/1994 corresponding to U.S. Pat. No. 5,405,896 a method for bonding to a thermoplastic resin an adhesive silicone elastomer composition containing an organic silicon compound having an aromatic ring as a tackifier. Since this adhesive silicone elastomer composition does not bond to metals, but self bonds to various thermoplastic resins, it becomes possible to directly apply and cure this composition to molded parts of thermoplastic resin without a need for a primer.

The above adhesive silicone elastomer composition, however, is still unsatisfactory in adhesion to polyamide resins which are typical engineering plastics. A further improvement in adhesion is desired.

Therefore, an object of the invention is to provide an adhesive silicone composition which can establish firm bonds with organic resins, especially nitrogenous organic resins, typically polyamide resins, but is less adhesive to metals so that when molded parts are prepared using metal molds, the molded parts can be readily removed from the molds.

SUMMARY OF THE INVENTION

The present invention provides an adhesive silicone composition comprising (A) 100 parts by weight of a diorganopolysiloxane containing at least two aliphatic unsaturated monovalent hydrocarbon radicals in a molecule, represented by the following average compositional formula (1):

$$R^1_a SiO_{(4-a)/2} \tag{1}$$

wherein $R^1$, which may be the same or different, represents substituted or unsubstituted monovalent hydrocarbon radicals, and letter a is a positive number in the range:

1.18<a≦2.2, the diorganopolysiloxane having a viscosity of 10 to 10,000,000 centipoise at 25° C., (B) 0 to 50 parts by weight of an organohydrogenpolysiloxane containing at least two hydrogen atoms each attached to a silicon atom in a molecule, represented by the following average compositional formula (2):

$$R^2_b H_c SiO_{(4-b-c)/2} \tag{2}$$

wherein $R^2$, which may be the same or different, represents substituted or unsubstituted monovalent hydrocarbon radicals, and letters b and c are positive numbers in the range: 0.78<b≦2, 0.005<c≦0.6, and 0.785<b+c≦2.6, (C) 0.01 to 30 parts by weight of an organic silicon compound having at least one phenyl skeleton, at least one nitrogen atom, and at least one hydrogen atom directly attached to a silicon atom, and (D) a catalytic amount of a platinum catalyst.

We have found that under ordinary addition curing conditions, the adhesive silicone composition of the invention firmly bonds to polyamide resins such as nylon 66 and aromatic polyamides, but not to metals.

Prior art adhesive silicone compositions utilize as a bonding force the hydrogen bond of silanol (SiOH) radicals created by dehydrogenation reaction of hydrosilyl (SiH) radicals with water. The hydrogen bond alone is not sufficient for bonding with thermoplastic resins. Additionally, since the prior art compositions can react with moisture on metal surface to form bonds to the metal, they are inadequate to mold in metal molds. It was then proposed to add to a silicone composition a compound having as its skeleton a portion of a structure analogous to a thermoplastic resin and terminated with a hydrosilyl radical. When silicone rubber is molded at a temperature at which the thermoplastic resin does not soften, no outstanding affinity is established between the resin and the resin analogous compound. This means that the silicone composition can be bonded to a limited type of resin. With this method, no bond can be made to polyamide resins such as nylon 66 because of their polarity.

Since amide bonds inherent to polyamide resins have a donor and an acceptor of a hydrogen bond, a compound having a complementary structure to amide bonds is expected to recognize the polyamide resins. By preorganization of the donor and acceptor of a hydrogen bond, supermolecular interaction can be maximized. Then, we newly synthesized as a compound having a macromolecule recognition capability, a compound having at least one aromatic ring, an organic radical having at least one nitrogen atom as a spacer, and a hydrosilyl radical at an end. This macromolecule recognizer was mixed in an addition curing type silicone rubber composition, which was examined for bond performance. Quite unexpectedly, we have found that the composition bonds to polyamide resins, but not to metals, and quite surprisingly, firmly bonds to a variety of thermoplastic resins other than polyamide resins. This composition can be readily separated from a metal mold and thus allows for composite integral molding. The present invention is predicated on this finding.

BRIEF DESCRIPTION OF THE DRAWING

The only FIGURE.

DETAILED DESCRIPTION OF THE INVENTION

Figure 1:
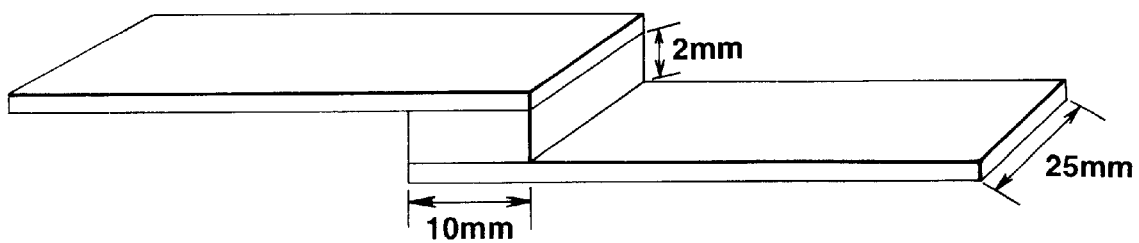
FIG. 1 is a perspective view of a test assembly used in a tensile shear adhesion test.

A first component (A) of the adhesive silicone composition of the invention is a diorganopolysiloxane of the average compositional formula (1). The diorganopolysiloxane contains at least two aliphatic unsaturated monovalent hydrocarbon radicals in a molecule. This component is a well-known organopolysiloxane used as a base in conventional addition curing type silicone elastomers.

$$R^1_a SiO_{(4-a)/2} \tag{1}$$

In formula (1), $R^1$ represents substituted or unsubstituted monovalent hydrocarbon radicals, the $R^1$ radicals may be the same or different, and letter a is a positive number in the range: 1.18<a≦2.2.

Preferably $R^1$ represents substituted or unsubstituted monovalent hydrocarbon radicals of 1 to 12 carbon atoms, more preferably 1 to 10 carbon atoms, for example, saturated hydrocarbon radicals including alkyl and cycloalkyl radicals, such as methyl, ethyl, propyl, isopropyl, butyl, isobutyl, tert-butyl, hexyl, cyclohexyl, octyl and decyl; alkenyl radicals such as vinyl, propenyl, allyl, isopropenyl, hexenyl, cyclohexenyl and butenyl; aryl radicals such as phenyl and xylyl; aralkyl radicals such as benzyl and phenylethyl; and halogen or cyano-substituted hydrocarbon radicals such as 3,3,3-trifluoropropyl and cyanoethyl. The radicals represented by $R^1$ may be the same or different while at least two alkenyl radicals must be contained in the molecule. Basically, the substituent on a silicon atom may be any of the foregoing substituents although it is desirable to introduce vinyl and allyl as the alkenyl radical and methyl, phenyl, and 3,3,3-trifluoropropyl as the other substituent. The alkenyl radical may be attached to a silicon atom at the end or an intermediate of the molecular chain, preferably a silicon atom at the end of the molecular chain.

The content of the aliphatic unsaturated monovalent hydrocarbon radicals in $R^1$ is preferably 0.001 to 20 mol %, more preferably 0.025 to 5 mol % of the entire $R^1$ radicals.

Letter a is a positive number in the range: 1.18<a≦2.2, preferably 1.8≦a<2.1, more preferably 1.95<a≦2.05.

The organopolysiloxane may be a linear one or a branched one partially containing $R^1SiO_{3/2}$ or $SiO_{4/2}$ units, and typically a linear diorganopolysiloxane whose backbone is composed essentially of recurring $R^1{}_2SiO_{2/2}$ units and blocked with a $R^1{}_3SiO_{1/2}$ unit at each end of the molecular chain.

Preferably the organopolysiloxane of average compositional formula (1) has an average degree of polymerization of about 100 to 10,000, especially about 200 to 5,000. The organopolysiloxane of average compositional formula (1) should have a viscosity of about 10 to 10,000,000 centipoise at 25° C., preferably about 100 to 1,000,000 centipoise at 25° C., more preferably about 200 to 50,000 centipoise at 25° C.

Such a diorganopolysiloxane can be prepared by well-known methods, for example, by effecting equilibration polymerization reaction between an organocyclopolysiloxane and a hexaorganodisiloxane in the presence of an alkali or acid catalyst, neutralizing the catalyst, and vacuum distilling off low molecular weight siloxanes.

A second component (B) of the adhesive silicone composition according to the invention is an organohydrogenpolysiloxane of the average compositional formula (2). The organohydrogenpolysiloxane contains at least two hydrogen atoms each attached to a silicon atom in a molecule, that is, at least two SiH radicals, and preferably at least three SiH radicals. This component is a well-known organopolysiloxane used as a crosslinking agent in conventional addition curing type silicone elastomers.

$$R^2{}_bH_cSiO_{(4-b-c)2} \quad (2)$$

In formula (2), $R^2$ represents substituted or unsubstituted monovalent hydrocarbon radicals, the $R^2$ radicals may be the same or different, and letters b and c are positive numbers in the range: 0.78<b≦2, 0.005<c≦0.6, and 0.785<b+c≦2.6.

Preferably, $R^2$ represents substituted or unsubstituted monovalent hydrocarbon radicals of 1 to 12 carbon atoms, more preferably 1 to 10 carbon atoms, for example, those exemplified for $R^1$, typically alkyl radicals such as methyl, ethyl, propyl, and octyl; alkenyl radicals such as vinyl and allyl; aryl radicals such as phenyl and tolyl; aralkyl radicals such as benzyl; and substituted ones of the foregoing radicals wherein some or all of the hydrogen atoms are replaced by halogen or the like such as 3,3,3-trifluoro-propyl and chloromethyl. The radicals represented by $R^2$ are preferably free of an aliphatic unsaturated bond. Inter alia, methyl, phenyl, and 3,3,3-trifluoropropyl radicals are preferable. The radicals represented by $R^2$ may be the same or different.

The organohydrogenpolysiloxane of the average compositional formula (2) should have at least two, especially at least three hydrogen atoms each attached to a silicon atom (i.e., SiH groups) in the molecule. The hydrogen atom may be attached to a silicon atom at the end or an intermediate of the molecular chain.

Letters b and c are positive numbers in the range: 0.78<b≦2, 0.005<c≦0.6, and 0.785<b+c≦2.6, preferably positive numbers satisfying 1<b<2, 0.01<c<0.5, and 1<b+c<2.5.

Exemplary organohydrogenpolysiloxanes include methylhydrogen cyclic polysiloxane, both end trimethylsiloxy-blocked methylhydrogenpolysiloxane, both end trimethylsiloxy-blocked dimethylsiloxane-methylhydrogensiloxane copolymers, both end dimethylhydrogensiloxy-blocked dimethylpolysiloxane, both end dimethylhydrogensiloxy-blocked dimethylsiloxane-methylhydrogensiloxane copolymers, both end trimethylsiloxy-blocked methylhydrogensiloxane-diphenylsiloxane-dimethylsiloxane copolymers, copolymers of $(CH_3)_2HSiO_{1/2}$ units and $SiO_{4/2}$ units, copolymers of $(CH_3)_2HSiO_{1/2}$ units, $(CH_3)_3SiO_{1/2}$ units and $SiO_{4/2}$ units, and copolymers of $(CH_3)_2HSiO_{1/2}$ units, $SiO_{4/2}$ units, and $(C_6H_5)SiO_{3/2}$ units.

The organohydrogenpolysiloxanes of average compositional formula (2) may be linear, branched, cyclic or three-dimensional network structure, with linear ones being preferred. They preferably have an average degree of polymerization of less than about 300, more preferably about 2 to 300, most preferably about 4 to 100, and a viscosity of about 0.5 to 5,000 centipoise at 25° C., more preferably about 1 to 3,000 centipoise at 25° C.

Such an organohydrogenpolysiloxane can be prepared by well-known methods, for example, by effecting equilibration polymerization reaction between an organohydrogencyclopolysiloxane and a hexaorganodisiloxane in the presence of an acid catalyst such as sulfuric acid, and neutralizing the catalyst.

The organohydrogenpolysiloxane (B) is blended in an amount of 0 to 50 parts, preferably 0.01 to 50 parts, more preferably 0.1 to 20 parts by weight per 100 parts by weight of the diorganopolysiloxane (A).

A third component (C) of the adhesive silicone composition according to the invention is a compound characterizing the invention, that is, an organic silicon compound having at least one phenyl skeleton (i.e., monovalent or divalent benzene ring structure), at least one nitrogen atom, and at least one hydrogen atom directly attached to a silicon atom (i.e., SiH radical) in a molecule. By adding component (C) to a silicone composition, the composition is made selectively adhesive in that it satisfactorily bonds to a variety of thermoplastic resins including nitrogenous organic resins such as polyamide resins, typically nylons, but not to metals so that the composition may be readily separated from a metal mold after molding.

Since component (C) also serves as a crosslinking agent through the mechanism that hydrosilylating addition reaction takes place between the SiH radical in its molecule and the alkenyl radicals in component (A), the organohydrogenpolysiloxane as component (B) can be omitted if desired. In other words, the organohydrogenpolysiloxane of component (B) described above is not an essential component in the present invention.

The organic silicon compound (C) has a nitrogenous radical which is preferably selected from the group consisting of —NR—, —NR—CO—, —NR—CO—O—, —NR—CO—NR—, —NR—CN—NR—, —NR—CH$_2$—CH(R)—CO—O—, —NR—CH$_2$—CH(OR)N—, —NR—CH(CH$_2$OR)—CH—, and mixtures thereof wherein R is hydrogen or a substituted or unsubstituted monovalent hydrocarbon radical of 1 to 6 carbon atoms, for example, alkyl radicals such as methyl, ethyl, propyl, isopropyl, butyl, isobutyl, tert-butyl, hexyl, and cyclohexyl and aryl radicals such as phenyl, as exemplified above for R$^1$ and R$^2$.

More illustratively and preferably, the organic silicon compound (C) is at least one compound selected from the group of organic silicon compounds of the following general formulas (3), (4), and (5).

$$P_1—(Q_2—P_2)_x—Q_2—P_1 \quad (3)$$

$$Q_1—(P_2—Q_2)_x—P_2—Q_1 \quad (4)$$

$$P_1—Q_1 \quad (5)$$

Herein, P$_1$ is a monovalent silyl or siloxane (i.e., siloxanyl) radical having at least one hydrogen atom attached to a silicon atom in a molecule, P$_2$ is a divalent silylene or siloxane radical having at least one hydrogen atom attached to a silicon atom in a molecule, Q$_1$ is a monovalent organic radical having at least one aromatic ring and at least one nitrogen atom, Q$_2$ is a divalent organic radical having at least one aromatic ring and at least one nitrogen atom, and letter x is 0 or a positive integer, preferably an integer of 0 to 10, more preferably an integer of 0 to 5.

In formulas (3) to (5), P$_1$ is a monovalent silyl or siloxane (i.e., siloxanyl) radical having at least one hydrogen atom attached to a silicon atom (i.e., SiH radical) in a molecule, preferably 1 to 20 hydrogen atoms each attached to a silicon atom. Examples of the radical represented by P$_1$ are given below where Ph$^1$ designates phenyl.

—SiH(CH$_3$)$_2$
—SiH$_2$CH$_3$
—SiH$_2$C$_2$H$_5$
—SiH$_2$Ph$^1$
—Si(OSi(CH$_3$)$_2$H)$_3$
—SiCH$_3$(OSi(CH$_3$)$_2$H)$_2$

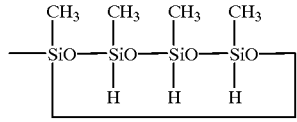

P$_2$ is a divalent silylene or siloxane radical having at least one hydrogen atom attached to a silicon atom (i.e., SiH radical) in a molecule, preferably 1 to 20 hydrogen atoms each attached to a silicon atom. Examples of the radical represented by P$_2$ are given below.

—SiH(CH$_3$)—
—SiH$_2$—
—SiH(C$_2$H$_5$)—
—SiH(Ph$^1$)—
—Si(Osi(CH$_3$)$_2$H)$_2$—
—SiCH$_3$(OSi(CH$_3$)$_2$H)—
—Si(CH$_3$)$_2$O—(SiH(CH$_3$)O)$_n$—Si(CH$_3$)$_2$O—
  where n is an integer of 1 to 40
—Si(CH$_3$)$_2$O—(SiCH$_3$(OSi(CH$_3$)$_2$H)—O—Si(CH$_3$)$_2$—
—Si(CH$_3$)$_2$O—(Si(OSi(CH$_3$)$_2$H)$_2$)—O—Si(CH$_3$)$_2$—
—Si(CH$_3$)$_2$O—(SiPh$^1$(OSi(CH$_3$)$_2$H) )—O—Si (CH$_3$)$_2$—

Q$_1$ is a monovalent organic radical having at least one aromatic ring, preferably 1 to 4 aromatic rings, and at least one nitrogen atom, preferably 1 to 6 nitrogen atoms. Examples of the monovalent organic radical represented by Q$_1$ are given below where Ph$^2$ designates phenylene.

—C$_3$H$_6$—NH—Ph$^1$
—C$_3$H$_6$—NH—CH$_2$—Ph$^1$
—C$_3$H$_6$—NH—Ph$^2$—CH$_2$—Ph$^1$
—C$_3$H$_6$—NH—Ph$^2$—Ph$^1$
—C$_3$H$_6$—NH—Ph$^2$—O—Ph$^1$
—C$_2$H$_4$—CO—NH—Ph$^1$
—C$_3$H$_6$—CO—NH—CH$_2$—Ph$^1$
—C$_2$H$_4$—CO—NH—Ph$^2$—Ph$^1$
—C$_3$H$_6$—CO—NH—Ph$^2$—CH$_2$—Ph$^1$
—C$_2$H$_4$—CO—NH—Ph$^2$—O—Ph$^1$
—C$_3$H$_6$—NH—CO—Ph$^1$
—C$_3$H$_6$—NH—CO—CH=CH—Ph$^1$
—C$_3$H$_6$—NH—CO—Ph$^2$—Ph$^1$
—C$_3$H$_6$—NH—CO—Ph$^2$—CH$_2$—Ph$^1$
—C$_3$H$_6$—O—CO—NH—Ph$^1$
—C$_3$H$_6$—O—CO—NH—CH$_2$—Ph$^1$
—C$_3$H$_6$—O—CO—NH—Ph$^2$—Ph$^1$
—C$_3$H$_6$—O—CO—NH—Ph$^2$—CH$_2$—Ph$^1$
—C$_3$H$_6$—NH—CO—NH—Ph$^1$
—C$_3$H$_6$—NH—CO—NH—CCH$_2$—Ph$^1$
—C$_3$H$_6$—NH—CO—NH—Ph$^2$—Ph$^1$
—C$_3$H$_6$—NH—CO—NH—Ph$^2$—CH$_2$—Ph$^1$

Q$_2$ is a divalent organic radical having at least one aromatic ring, preferably 1 to 4 aromatic rings, and at least one nitrogen atom, preferably 1 to 6 nitrogen atoms. Examples of the divalent organic radical represented by Q$_2$ are given below.

—C$_3$H$_6$—NH—Ph$^2$—NH—C$_3$H$_6$—
—C$_3$H$_6$—Ph$^2$—NH—C$_6$H$_{12}$—NH—Ph$^2$—C$_3$H$_6$—
—C$_3$H$_6$—NH—Ph$^2$—Ph$^2$—NH—C$_3$H$_6$—
—C$_3$H$_6$—NH—Ph$^2$—CH$_2$—Ph$^2$—NH—C$_3$H$_6$—
—C$_3$H$_6$—NH—Ph$^2$—CO—Ph$^2$—NH—C$_3$H$_6$—
—C$_3$H$_6$—NH—Ph$^2$—O—Ph$^2$—NH—C$_3$H$_6$—
—C$_2$H$_4$—CO—NH—Ph$^2$—NH—CO—C$_2$H$_4$—
—C$_3$H$_6$—CO—NH—CH$_2$—Ph$^2$—CH$_2$—NH—CO—C$_3$H$_6$—
—C$_3$H$_6$—Ph$^2$—CO—NH—C$_6$H$_{12}$—NH—CO—Ph$^2$—C$_3$H$_6$—
—C$_2$H$_4$—CO—NH—Ph$^2$—Ph$^2$—NH—CO—C$_2$H$_4$—
—C$_3$H$_6$—CO—NH—Ph$^2$—CH$_2$—Ph$^2$—NH—CO—C$_3$H$_6$—
—C$_2$H$_4$—CO—NH—Ph$^2$—CO—Ph$^2$—NH—CO—C$_2$H$_4$—
—C$_2$H$_4$—CO—NH—Ph$^2$—O—Ph$^2$—NH—CO—C$_2$H$_4$—
—C$_3$H$_6$—NH—CO—Ph$^2$—CO—NH—C$_3$H$_6$—
—C$_3$H$_6$—Ph$^2$—NH—CO—C$_4$H$_8$—CO—NH—Ph$^2$—C$_3$H$_6$—

—C$_3$H$_6$—NH—CO—Ph$^2$—Ph$^2$—CO—NH—C$_3$H$_6$—
—C$_3$H$_6$—NH—CO—Ph$^2$—CH$_2$—Ph$^2$—CO—NH—C$_3$H$_6$—
—C$_3$H$_6$—NH—CO—Ph$^2$—CO—Ph$^2$—CO—NH—C$_3$H$_6$—
—C$_3$H$_6$—NH—CO—Ph$^2$—Q—Ph$^2$—CO—NH—C$_3$H$_6$—
—C$_3$H$_6$—O—CO—NH—Ph$^2$—NH—CO—O—C$_3$H$_6$—
—C$_3$H$_6$—O—CO—NH—CH$_2$—Ph$_2$—CH$_2$—NH—CO—O—C$_3$H$_6$—
—C$_3$H$_6$—Ph$^2$—O—CO—NH—C$_6$H$_{12}$—NH—CO—O—Ph$^2$—C$_3$H$_6$—
—C$_3$H$_6$—O—CO—NH—Ph$^2$—Ph$^2$—NH—CO—O—C$_3$H$_6$—
—C$_3$H$_6$—O—CO—NH—Ph$^2$—CH$_2$—Ph$^2$—NH—CO—O—C$_3$H$_6$—
—C$_3$H$_6$—O—CO—NH—Ph$^2$—CO—Ph$^2$—NH—CO—O—C$_3$H$_6$—
—C$_3$H$_6$—O—CO—NH—Ph$^2$—O—Ph$^2$—NH—CO—O—C$_3$H$_6$—
—C$_3$H$_6$—NH—CO—NH—Ph$^2$—NH—CO—NH—C$_3$H$_6$—
—C$_3$H$_6$—Ph$^2$—NH—CO—NH—C$_6$H$_{12}$—NH—CO—NH—Ph$^2$—C$_3$H$_6$—
—C$_3$H$_6$—NH—CO—NH—Ph$^2$—Ph$^2$—NH—CO—NH—C$_3$H$_6$—
—C$_3$H$_6$—NH—CO—NH—Ph$^2$—CH$_2$—Ph$^2$—NH—CO—NH—C$_3$H$_6$—
—C$_3$H$_6$—NH—CO—NH—Ph$^2$—CO—Ph$^2$—NH—CO—NH—C$_3$H$_6$—
—C$_3$H$_6$—NH—CO—NH—Ph$^2$—O—Ph$^2$—NH—CO—NH—C$_3$H$_6$—

It is preferred that the organic silicon compounds of formulas (3), (4), and (5) each have at least two, especially at least three hydrogen atoms each attached to a silicon atom (i.e., SiH radicals) in a molecule. These hydrogen atoms may be attached to silicon atoms at terminal or intermediate positions of the molecular chain, especially to adjacent silicon atoms. The number of silicon atoms in the molecule is preferably 2 to 100, especially 4 to 50.

The organic silicon compounds of formulas (3), (4), and (5) are organohydrogenpolysiloxanes which may be linear, branched, cyclic or three-dimensional network structure.

Illustrative examples of the organic silicon compounds of formulas (3), (4), and (5) are given below.

X—C$_3$H$_6$—NH—Ph$^2$—NH—C$_3$H$_6$—X
X—C$_3$H$_6$—NH—Ph$^2$—Ph$^2$—NH—C$_3$H$_6$—X
X—C$_3$H$_6$—NH—Ph$^2$—CH$_2$—Ph$^2$—NH—C$_3$H$_6$—X
X—C$_2$H$_4$—CO—NH—Ph$^2$—NH—CO—C$_2$H$_4$—X
X—C$_2$H$_4$—CO—NH—Ph$^2$—CH$_2$—Ph$^2$—NH—CO—C$_2$H$_4$—X
X—C$_3$H$_6$—CO—NH—Ph$^2$—CH$_2$—Ph$^2$—NH—CO—C$_3$H$_6$—X
X—C$_2$H$_4$—CO—NH—Ph$^2$—O—Ph$^2$—NH—CO—C$_2$H$_4$—X
X—C$_3$H$_6$—NH—CO—Ph$^2$—CO—NH—C$_3$H$_6$—X
X—C$_3$H$_6$—NH—CO—Ph$^2$—CO—Ph$^2$—CO—NH—C$_3$H$_6$—X
X—C$_3$H$_6$—O—CO—NH—Ph$^2$—NH—CO—O—C$_3$H$_6$—X
X—C$_3$H$_6$—O—CO—NH—CH$_2$—Ph$^2$—CH$_2$—NH—CO—O—C$_3$H$_6$—X
X—C$_3$H$_6$—O—CO—NH—CH$_2$—Ph$^2$—CH$_2$—NH—CO—O—C$_3$H$_6$—X
X—C$_3$H$_6$—NH—CO—NH—Ph$^2$—NH$_2$—CO—NH—C$_3$H$_6$X
X—C$_3$H$_6$—NH—CO—NH—Ph$^2$CH$_2$—Ph$^2$—NH—CO—NH—C$_3$H$_6$—X

Y—SiH(CH$_3$)—Y
Y—SiH$_2$—Y
Y—SiH(C$_2$H$_5$)—Y
Y—SiH(Ph$^1$)—Y
Y—Si(OSi(CH$_3$)$_2$H)$_2$—Y
Y—SiCH$_3$(OSi(CH$_3$)$_2$H)—Y
Y—Si(CH$_3$)$_2$O—(SiH(CH$_3$)O)$_n$—Si(CH$_3$)$_2$—Y
n is an integer of 1 to 40.
Y—Si(CH$_3$)$_2$O—(SiPh$^1$(OSi(CH$_3$)$_2$H))—Si(CH$_3$)$_2$—Y
Y—Si(CH$_3$)$_2$O—(Si(OSi(CH$_3$)$_2$H)$_2$)—Si(CH$_3$)$_2$—Y
Y—Si(CH$_3$)$_2$O—(SiCH$_3$(OSi(CH$_3$)$_2$H))—Si(CH$_3$)$_2$—Y
X—C$_3$H$_6$—NH—Ph$^1$
X—C$_3$H$_6$—NH—CH$_2$—Ph$^1$
X—C$_3$H$_6$—NH—Ph$^2$—CH$_2$—Ph$^1$
X—C$_3$H$_6$—NH—Ph$^2$—Ph$^1$
X—C$_3$H$_6$—NH—Ph$^2$—O—Ph$^1$
X—C$_2$H$_4$—CO—NH—Ph$^1$
X—C$_3$H$_6$—CO—NH—CH$_2$—Ph$^1$
X—C$_2$H$_4$—CO—NH—Ph$^2$—Ph$^1$
X—C$_3$H$_6$—CO—NH—Ph$^2$—CH$_2$—Ph$^1$
X—C$_2$H$_4$—CO—NH—Ph$^2$—O—Ph$^1$
X—C$_3$H$_6$—NH—CO—Ph$^1$
X—C$_3$H$_6$—NH—CO—CH=CH—Ph$^1$
X—C$_3$H$_6$—NH—CO—Ph$^2$—Ph$^1$
X—C$_3$H$_6$—NH—CO—Ph$^2$—CH$_2$—Ph$^1$
X—C$_3$H$_6$—O—CO—NH—Ph$^1$
X—C$_3$H$_6$—O—CO—NH—CH$_2$—Ph$^1$
X—C$_3$H$_6$—O—CO—NH—Ph$^2$—Ph$^1$
X—C$_3$H$_6$—O—CO—NH—Ph$^2$—CH$_2$—Ph$^1$
X—C$_3$H$_6$—NH—CO—NH—Ph$^1$
X—C$_3$H$_6$—NH—CO—NH—CH$_2$—Ph$^1$
X—C$_3$H$_6$—NH—CO—NH—Ph$^2$—Ph$^1$
X—C$_3$H$_6$—NH—CO—NH—Ph$^2$—CH$_2$—Ph$^1$ In the above example, X is —SiH(CH$_3$)$_2$, —SiH$_2$(CH$_3$), —SiH$_2$(C$_2$H$_3$), —SiH$_2$(Ph$^1$), —Si(OSi(CH$_3$)$_2$H)$_3$, —SiCH$_3$(OSi(CH$_3$)$_2$H)$_2$, or 1,3,5,7-tetramethyl-3,5,7-trihydrocyclotetrasiloxane radical. Y is at least one radical selected from the following.

—C$_3$H$_6$—NH—Ph$^1$
—C$_3$H$_6$—NH—CH$_2$—Ph$^1$
—C$_3$H$_6$—NH—Ph$^2$—CH$_2$—Ph$^1$
—C$_3$H$_6$—NH—Ph$^2$—Ph$^1$
—C$_3$H$_6$—NH—Ph$^2$—O—Ph$^1$
—C$_2$H$_4$—CO—NH—Ph$^1$
—C$_3$H$_6$—CO—NH—CH$_2$—Ph$^1$
—C$_2$H$_4$—CO—NH—Ph$^2$—Ph$^1$
—C$_3$H$_6$—CO—NH—Ph$^2$—CH$_2$—Ph$^1$
—C$_2$H$_4$—CO—NH—Ph$^2$—O—Ph$^1$
—C$_3$H$_6$—NH—CO—Ph$^1$
—C$_3$H$_6$—NH—CO—CH=CH—Ph$^1$
—C$_3$H$_6$—NH—CO—Ph$^2$—Ph$^1$
—C$_3$H$_6$—NH—CO—Ph$^2$—CH$_2$—Ph$^1$

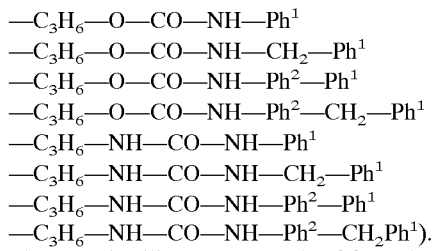

—C₃H₆—O—CO—NH—Ph¹
—C₃H₆—O—CO—NH—CH₂—Ph¹
—C₃H₆—O—CO—NH—Ph²—Ph¹
—C₃H₆—O—CO—NH—Ph²—CH₂—Ph¹
—C₃H₆—NH—CO—NH—Ph¹
—C₃H₆—NH—CO—NH—CH₂—Ph¹
—C₃H₆—NH—CO—NH—Ph²—Ph¹
—C₃H₆—NH—CO—NH—Ph²—CH₂Ph¹).

The organic silicon compounds of formulas (3), (4), and (5) may have functional radicals conventionally used as a tackifying component, for example, hydrolyzable radicals as typified by alkoxy and acetoxy radicals directly attached to silicon atoms, epoxy radicals, and acid anhydride radicals. However, when these functional radicals are active, the compounds render the composition bondable to metals with the risk that the composition may not be readily separated from metal molds.

The organic silicon compound of formulas (3), (4) or (5) is blended in an amount of 0.01 to 30 parts, preferably 0.1 to 20 parts by weight per 100 parts by weight of the diorganopolysiloxane (A). Less than 0.01 part of the organic silicon compound is too small to provide bonding to thermoplastic resins whereas more than 30 parts adversely affects the physical properties of cured products.

More preferably from the standpoints of cured physical properties and adhesion, components (B) and (C) are blended in such amounts that the molar ratio of the sum of the moles of the silicon atom-attached hydrogen atoms (SiH radicals) in component (B) and the silicon atom-attached hydrogen atoms (SiH radicals) in component (C) to the moles of the alkenyl radicals in component (A) may range from about 0.5/1 to about 10/1, especially from about 1/1 to about 5/1.

A fourth component (D) of the adhesive silicone composition is a platinum catalyst which is platinum or a platinum group metal compound. The catalyst promotes addition reaction between component (A) and components (B) and/or (C) for crosslinking. A choice may be made of well-known platinum catalysts including elemental platinum, platinum black, and platinum compounds such as chloroplatinic acid, alcohol-modified chloroplatinic acid, and complexes of chloroplatinic acid with olefins, aldehydes, vinyl siloxanes, and acetylene alcohols.

Also useful are platinum catalyst enclosures wherein platinum or platinum group metal compounds are embedded in silicone resins or thermoplastic resins having a melting point of 40 to 200° C., platinum catalyst enclosures wherein platinum or platinum group metal compounds are embedded in unsaturated bond-bearing compounds having a melting point of 40 to 200° C. These platinum catalyst enclosures may be further embedded in silicone resins or thermoplastic resins.

The platinum catalyst is used in a catalytic amount. The catalytic amount may be determined as appropriate depending on the desired curing rate although it is usually about 1 to 2,000 ppm, especially about 1 to 200 ppm calculated as platinum metal.

In addition to the foregoing essential components, the adhesive silicone composition of the invention may further contain other optional components. Where it is desired to impart physical strength to the composition, finely divided silica having a specific surface area of more than about 50 m²/g (usually 50 to 500 m²/g, preferably 100 to 400 m²/g) as measured by BET method is advantageously added. Examples of the reinforcing silica include Aerosil 130, 200 and 300 (commercially available from Nippon Aerosil K.K. and Degussa), Cabosil MS-5 and MS-7 (commercially available from Cabot Corp.), Rheorosil QS-102 and 103 (commercially available from Tokuyama Soda K.K.), and Nipsil Lp (commercially available from Nippon Silica K.K.) as hydrophilic silica and Aerosil R-812, R-972, and R-974 (commercially available from Degussa), Rheorosil MT-100 (commercially available from Tokuyama Soda K.K.), and Nipsil SS-70 (commercially available from Nippon Silica K.K.) as hydrophobic silica. Preferably the finely divided silica is added in amounts of about 0.5 to about 200 parts, especially about 5 to about 50 parts by weight per 100 parts by weight of component (A) or diorganopolysiloxane.

In blending finely divided silica, wetting agents may be used. Exemplary wetting agents are silazane compounds such as hexamethylsilazane, water, organopolysiloxanes having silanol radicals other than the above-mentioned ones, organohydrogenpolysiloxanes having a hydrogen atom directly attached to a silicon atom other than the above-mentioned ones, and compounds having hydrolyzable radicals as typified by alkoxy radicals. It is understood that these optional components may be added in conventional amounts insofar as the advantages of the invention are not impaired.

If it is desired to adjust the curing time in order that the composition be practical, there may be blended curing control agents. Any of well-known curing control agents may be used, for example, vinyl radical-containing organopolysiloxanes (e.g., tetravinylcyclotetrasiloxane and vinyl siloxane oil having vinyl radicals on side chains and/or at ends), triallyl isocyanurate, alkyl maleates, acetylene alcohols and silylated or siloxane-modified products thereof, hydroperoxides, tetramethylethylenediamine, benzotriazole, and mixtures thereof. The control agent may be added in an appropriate amount in accordance with the desired curing rate insofar as it does not inhibit the composition of the invention from curing.

It is also acceptable to add semi-reinforcing fillers such as ground quartz, diatomaceous earth, and calcium carbonate; coloring agents such as inorganic pigments (e.g., cobalt blue) and organic dyes; and agents for enhancing heat resistance and flame retardancy such as cerium oxide, zinc carbonate, manganese carbonate, iron oxide, titanium oxide, aluminum oxide, aluminum hydroxide, magnesium hydroxide, and carbon black. These agents may be added in conventional amounts insofar as the object of the invention is not impaired.

The adhesive silicone composition of the invention may be prepared by uniformly mixing the essential and optional components in a conventional manner. It may be prepared in one-package or two-package form. When the composition is prepared in two-package form so that the two parts are mixed before curing, it is preferable that components (B) and (C) be included in a common package. Where the inventive composition is to be subject to heat treatment, it is desired that component (C) be added subsequent to the heat treatment.

Desired curing conditions for the inventive composition include a temperature of 100 to 200° C. and a time of 1 to 60 minutes.

There has been described an adhesive silicone composition which firmly adheres to organic resins, especially polyamide resins, but not to metals. Therefore, the adhesive silicone composition is useful in molding one-piece parts with organic resins, especially heat resistant organic resins containing nitrogen atoms, typically polyamide resins and polyimide resins, by injection molding, extrusion molding, or mechanical application (by means of robots). In preparing molded parts of the inventive silicone composition and an organic resin using a mold, the silicone composition can exhibit the unique character that it does not bond to the mold, but to the resin, insofar as a suitable material is selected for the mold.

EXAMPLE

Examples of the invention are given below by way of illustration and not by way of limitation. All parts are by weight.

Examples 1–40 & Comparative Examples 1–10

A kneader was charged with 100 parts of dimethylpolysiloxane blocked with a dimethylvinylsilyl radical at each end and having a viscosity of 10,000 centipoise at 25° C., 50 parts of fumed silica surface treated with trimethylsilyl radicals and having a specific surface area of 200 m²/g, and 2 parts of water. The ingredients were kneaded for one hour at room temperature and then heated to 160° C. and kneaded for a further 2 hours at the temperature. Thereafter, the mixture was cooled down to room temperature. To the mixture were added 40 parts of the dimethylpolysiloxane blocked with a dimethylvinylsilyl radical at each end and having a viscosity of 10,000 centipoise at 25° C., 3 parts of methylhydrogenpolysiloxane blocked with a trimethylsilyl radical at each end, containing 30 mol % of a hydrogen atom attached to a silicon atom in all the siloxane units in a molecule, and having a viscosity of 10 centipoise at 25° C., 2 parts of methylvinylpolysiloxane blocked with a trimethylsilyl radical at each end, containing 10 mol % of a vinyl radical attached to a silicon atom, and having a viscosity of 1,000 centipoise at 25° C., 0.1 part of 2-ethynyl-2-propanol, and 100 ppm calculated as elemental platinum of a complex of platinum with 1,1,3,3-tetramethyl-1,3-divinyldisiloxane. The mixture was thoroughly mixed until uniform, obtaining a liquid silicone composition A of the addition curing type.

The silicone composition A was placed in a press mold and heated at 120° C. for 10 minutes, obtaining a cured sheet of 2 mm thick. Its physical properties are shown below.

Hardness (JIS A scale): 40

Tensile strength: 90 kgf/cm²

Elongation: 500%

Next, compositions B, C, D, and E were prepared by adding 0.5 part of compounds of the following formulas (6), (7), (8), and (9) to 100 parts of silicone composition A, respectively. For comparison purposes, composition F was prepared by adding 0.5 part of a compound of the following formula (10) to 100 parts of silicone composition A.

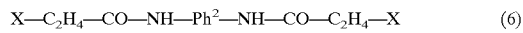

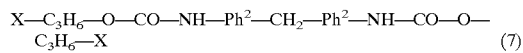

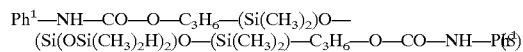

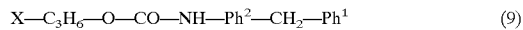

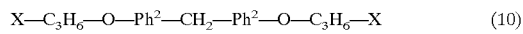

In the above formulas, X is

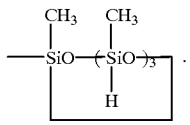

The compositions B to F were examined for adhesion by the following test.

Adhesion Test

Tensile shear adhesive test assemblies as shown in FIG. 1 were prepared by bonding a pair of pieces with a silicone composition. Test pieces of 25 mm×100 mm×2 mm thick were made of 66 nylon resin (PA66), 6T nylon resin (PA6T), polyethylene terephthalate resin (PET), polybutylene terephthalate resin (PBT), polyphenylene sulfide resin (PPS), polycarbonate resin (PC), polymethyl methacrylate resin (PMMA), and acrylonitrile-butadiene-styrene resin (ABS). Other test pieces of 25 mm×100 mm×0.3 mm thick were made of chromium-plated metal (Cr) and nickel-plated metal (Ni). The silicone composition was cured in a constant temperature chamber by heating at 120° C. for 10 minutes. The test assembly was examined for adhesion by pulling one test piece at a pulling speed of 50 mm/min. by means of an autograph. The results are shown in Tables 1 to 5. In the results, the evaluation of adhesion is as follows:

bonded; cohesion failure of 70% to 100% separated; cohesion failure of 0% to less than 70%

TABLE 1

|  | Example | | | | | | | | | |
| --- | --- | --- | --- | --- | --- | --- | --- | --- | --- | --- |
|  | 1 | 2 | 3 | 4 | 5 | 6 | 7 | 8 | 9 | 10 |
| Composition | B | B | B | B | B | B | B | B | B | B |
| Adherend | PA66 | PA6T | PET | PBT | PPS | PC | PMMA | ABS | Cr | Ni |
| Adhesion | bonded | bonded | bonded | bonded | bonded | bonded | bonded | bonded | separated | separated |

TABLE 2

|  | Example | | | | | | | | | |
| --- | --- | --- | --- | --- | --- | --- | --- | --- | --- | --- |
|  | 11 | 12 | 13 | 14 | 15 | 16 | 17 | 18 | 19 | 20 |
| Composition | C | C | C | C | C | C | C | C | C | C |
| Adherend | PA66 | PA6T | PET | PBT | PPS | PC | PMMA | ABS | Cr | Ni |
| Adhesion | bonded | bonded | bonded | bonded | bonded | bonded | bonded | bonded | separated | separated |

TABLE 3

| | Example | | | | | | | | | |
|---|---|---|---|---|---|---|---|---|---|---|
| | 21 | 22 | 23 | 24 | 25 | 26 | 27 | 28 | 29 | 30 |
| Composition | D | D | D | D | D | D | D | D | D | D |
| Adherend | PA66 | PA6T | PET | PBT | PPS | PC | PMMA | ABS | Cr | Ni |
| Adhesion | bonded | bonded | bonded | bonded | bonded | bonded | bonded | bonded | separated | separated |

TABLE 4

| | Example | | | | | | | | | |
|---|---|---|---|---|---|---|---|---|---|---|
| | 31 | 32 | 33 | 34 | 35 | 36 | 37 | 38 | 39 | 40 |
| Composition | E | E | E | E | E | E | E | E | E | E |
| Adherend | PA66 | PA6T | PET | PBT | PPS | PC | PMMA | ABS | Cr | Ni |
| Adhesion | bonded | bonded | bonded | bonded | bonded | bonded | bonded | bonded | separated | separated |

TABLE 5

| | Comparative Example | | | | | | | | | |
|---|---|---|---|---|---|---|---|---|---|---|
| | 1 | 2 | 3 | 4 | 5 | 6 | 7 | 8 | 9 | 10 |
| Composition | F | F | F | F | F | F | F | F | F | F |
| Adherend | PA66 | PA6T | PET | PBT | PPS | PC | PMMA | ABS | Cr | Ni |
| Adhesion | separated | separated | bonded | bonded | separated | bonded | separated | separated | separated | separated |

As is evident from Tables 1 to 5, the adhesive silicone compositions within the scope of the invention form firm bonds to resin pieces.

Japanese Patent Application No. 319037/1997 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

What is claimed is:

1. An adhesive silicone composition comprising:

(A) 100 parts by weight of a diorganopolysiloxane containing at least two aliphatic unsaturated monovalent hydrocarbon radicals in a molecule, represented by the following average compositional formula (1):

$$R^1{}_a SiO_{(4-a)/2} \tag{1}$$

wherein each $R^1$, which may be the same or different, represents a substituted or unsubstituted monovalent hydrocarbon radicals, and a is a positive number in the range: $1.18 < a < 2.2$, said diorganopolysiloxane having a viscosity of 10 to 10,000,000 centipoise at 25° C.;

(B) 0 to 50 parts by weight of an organohydrogenpolysiloxane containing at least two hydrogen atoms each attached to a silicon atom in a molecule, represented by the following average compositional formula (2):

$$R^2{}_b H_c SiO_{(4-b-c)/2} \tag{2}$$

wherein each $R^2$, which may be the same or different, represents a substituted or unsubstituted monovalent hydrocarbon radicals, and b and c are positive numbers in the range: $0.78 < b \leq 2$, $0.005 < c \leq 0.6$, and $0.785 < b+c \leq 2.6$;

(C) 0.01 to 30 parts by weight of an organic silicon compound having at least one phenyl skeleton, at least one nitrogen atom, and at least one hydrogen atom directly attached to a silicon atom in a molecule, wherein said nitrogen atom is contained as a nitrogenous radical which is selected from the group consisting of —NR—, —NR—CO—, —NR—CO—O—, —NR—CO—NR—, —NR—CN—NR—, —NR—CH$_2$—CH(R)—CO—O—, —NR—CH$_2$—CH(OR)—, —NR—CH(CH$_2$OR)—CH—, and mixtures thereof, wherein R is hydrogen or a substituted or unsubstituted monovalent hydrocarbon radical of 1 to 6 carbon atoms; and (D) a catalytic amount of a platinum catalyst.

2. The adhesive silicone composition of claim 1, wherein the organic silicon compound (C) is at least one compound selected from the group of organic silicon compounds of the following general formulas (3), (4), and (5):

$$P_1-(Q_2-P_2)_x-Q_2-P_1 \tag{3}$$

$$Q_1-(P_2-Q_2)_x-P_2-Q_1 \tag{4}$$

$$P_1-Q_1 \tag{5}$$

wherein $P_1$ is a monovalent silyl or siloxane radical having at least one hydrogen atom attached to a silicon atom in a molecule, $P_2$ is a divalent silylene or siloxane radical having at least one hydrogen atom attached to a silicon atom in a molecule, $Q_1$ is a monovalent organic radical having at least one aromatic ring and at least one nitrogen atom, $Q_2$ is a divalent organic radical having at least one aromatic ring and at least one nitrogen atom, and x is 0 or a positive integer.

3. A bonded nitrogenous organic resin comprising a nitrogenous organic resin and the adhesive silicone composition of claim 1.

4. An adhesive silicone composition as claimed in claim 1, wherein $R^1$ comprises a hydrocarbon radical of from 1 to 12 carbon atoms.

5. An adhesive silicone composition as claimed in claim 1, wherein $R^1$ comprises a hydrocarbon radical of from 1 to 10 carbon atoms.

6. An adhesive silicone composition as claimed in claim 1, wherein $R^1$ contains from 0.001 to 20 mol % aliphatic unsaturated monovalent hydrocarbon radicals, based on the total content of $R^1$ radicals.

7. An adhesive silicone composition as claimed in claim 1, wherein $R^1$ contains from 0.025 to 5 mol % aliphatic unsaturated monovalent hydrocarbon radicals, based on the total content of $R^1$ radicals.

8. An adhesive silicone composition as claimed in claim 1, wherein $1.8 \leq a < 2.1$.

9. An adhesive silicone composition as claimed in claim 1, wherein $1.95 \leq a < 2.05$.

10. An adhesive silicone composition as claimed in claim 1, wherein the organopolysiloxane has a viscosity of from 200 to 50,000 centipoise at 25° C.

11. An adhesive silicone composition as claimed in claim 1, wherein $1 < b \leq 2$, $0.01 < c < 0.5$, and $1 < b+c < 2.5$.

12. An adhesive silicone composition as claimed in claim 1, wherein component (B) is present in an amount of from 0.1 to 20 parts by weight per 100 parts by weight of component (A).

13. An adhesive silicone composition as claimed in claim 1, wherein the organohydrogenpolysiloxane has at least three hydrogen atoms each attached to a silicon atom.

14. An adhesive silicone composition as claimed in claim 2, wherein x is an integer of from 0 to 5.

15. An adhesive silicone composition as claimed in claim 1, wherein the platinum catalyst is elemental platinum, platinum black, chloroplatinic acid, or a complex of chloroplatinic acid with an olefin, aldehyde, vinyl siloxane, or acetyl alcohol.

16. An adhesive silicone composition as claimed in claim 1, wherein the platinum catalyst is present in an amount of from 1 to 2000 ppm.

17. An adhesive silicone composition as claimed in claim 1, further comprising finely divided silica, ground quartz, diatomaceous earth, or calcium carbonate.

18. An adhesive silicone composition as claimed in claim 1, further comprising coloring agents.

19. An adhesive coloring composition as claimed in claim 1, further comprising heat resistance and flame retardancy improving agents.

* * * * *